(12) United States Patent
Guldenfels

(10) Patent No.: US 6,516,944 B2
(45) Date of Patent: Feb. 11, 2003

(54) MODULE WITH ALTERNATING, OFFSET CROSS-RIB

(75) Inventor: Dieter Guldenfels, Pfeffingen (CH)

(73) Assignee: Habasit AG, Reinach (CH)

( * ) Notice: Subject to any disclaimer, the term of this patent is extended or adjusted under 35 U.S.C. 154(b) by 0 days.

(21) Appl. No.: 09/931,504

(22) Filed: Aug. 16, 2001

(65) Prior Publication Data

US 2002/0020612 A1 Feb. 21, 2002

Related U.S. Application Data

(60) Provisional application No. 60/226,648, filed on Aug. 21, 2000.

(51) Int. Cl.[7] .......................... B65G 17/06; B65G 17/38
(52) U.S. Cl. ........................................ 198/853; 198/850
(58) Field of Search ....................... 198/850, 851, 198/852, 853

(56) References Cited

U.S. PATENT DOCUMENTS

| | | | | |
|---|---|---|---|---|
| 5,123,524 A | * | 6/1992 | Lapeyre | 198/853 |
| 5,156,262 A | * | 10/1992 | Horton | 198/851 |
| 5,174,438 A | * | 12/1992 | Witham | 198/853 |
| 6,079,543 A | * | 6/2000 | Palmaer | 198/853 |
| 6,202,834 B1 | * | 3/2001 | Layne et al. | 198/852 |
| 6,412,625 B2 | * | 7/2002 | Damkjaer | 198/853 |
| 6,439,378 B1 | * | 8/2002 | MacLachlan | 198/85 |
| 6,471,049 B1 | * | 10/2002 | Van Esch et al. | 198/853 |

* cited by examiner

Primary Examiner—Douglas Hess
(74) Attorney, Agent, or Firm—Hodgson Russ LLP

(57) ABSTRACT

A module having a cross-rib that is alternately offset from a centerline of the module and that is used in connection with a double row sprocket with alternating sprocket teeth. The module is of the type where a series of spaced apart link ends extending from each side of the module include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are then connected together to form an endless conveyor belt capable of articulating about a drive sprocket.

18 Claims, 8 Drawing Sheets

MODULE WITH ALTERNATING, OFFSET CROSS-RIB

CROSS-REFERENCE TO RELATED APPLICATION

Applicant hereby claims priority based on U.S. Provisional Application No. 60/226,648 filed Aug. 21, 2000, entitled "Center Drive Sprocket Engagement Side by Side Offset Centerline" which is incorporated herein by reference.

FIELD OF INVENTION

The present invention relates to modular conveying apparatus.

BACKGROUND OF THE INVENTION

Because they do not corrode, are light weight, and are easy to clean, unlike metal conveyor belts, plastic conveyor belts are used widely, especially in conveying food products. Modular plastic conveyor belts are made up of molded plastic modular links, or belt modules, that can be arranged side by side in rows of selectable width. A series of spaced apart link ends extending from each side of the modules include aligned apertures to accommodate a pivot rod. The link ends along one end of a row of modules are interconnected with the link ends of an adjacent row. A pivot rod journaled in the aligned apertures of the side-by-side and end-to-end connected modules forms a hinge between adjacent rows. Rows of belt modules are then connected together to form an endless conveyor belt capable of articulating about a drive sprocket.

In some applications the belt modules are provided with a rib disposed across the mid-portion of the module. The cross-rib is disposed perpendicular to the direction of belt travel and provides a driving surface capable of engaging with the teeth of the drive sprocket. The shape of the sprocket tooth and engaging cross-rib are designed for the best performance and maximum torque transmission from the sprockets to the belt. Preferably the design avoids the disengagement of the sprocket due to the sprocket slipping radially out of engagement with the cross-rib. Referring to FIG. 1, in order to move the sprocket tooth smoothly into engagement without collision between the tooth corner and the face 7 of the rib 9, the angle 10 of the engaging rib face 7 (right side of FIG. 1) with respect to axis 13 in FIG. 1 has to be less than or equal to ninety degrees with ninety degrees being the preferred angle. Also, as the distance 16 increases, the angle of sprocket engagement becomes steeper and the risk of disengagement under high torque is reduced. For bi-directional drives, two sprocket teeth are used on both sides of the central rib. The teeth engage on the left face or on the right face of the rib 9 depending on the direction of belt travel. The optimization of the cross-rib 9 according to the above-described parameters leads to a very thick cross-rib as shown in FIG. 1.

What is needed is a module design that provides an optimal design with regard to torque transmission yet avoids the thick cross-rib 9 shown in FIG. 1.

SUMMARY OF THE INVENTION

The present invention meets the above-described need by providing a module having a cross-rib that is alternately offset from a centerline of the module and that is used in connection with a double row sprocket with alternating sprocket teeth.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figure 1:
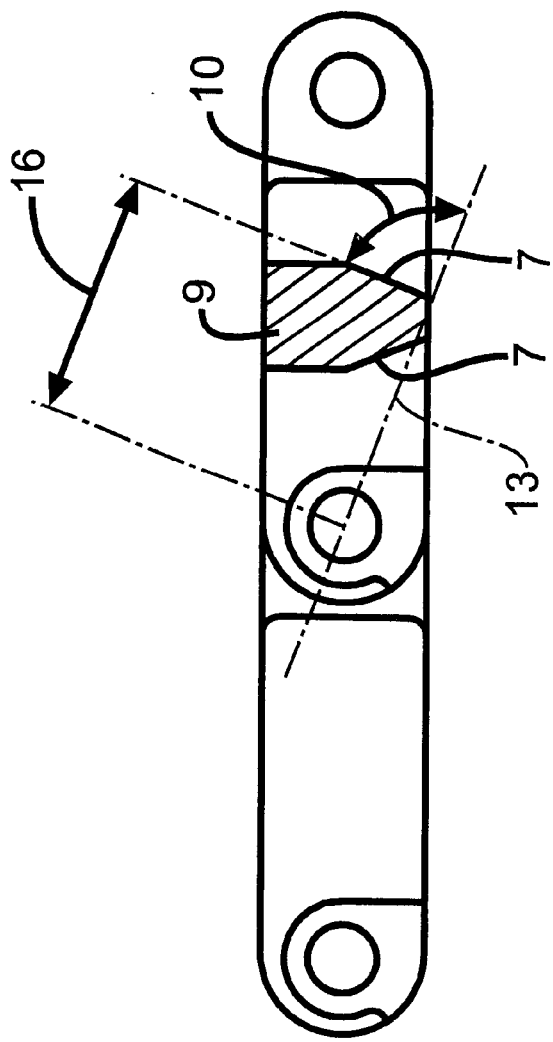
FIG. 1 is a side elevational view of a prior art belt module having a thick cross-rib for bi-directional engagement with a sprocket having double teeth in a single row.
Figure 2:
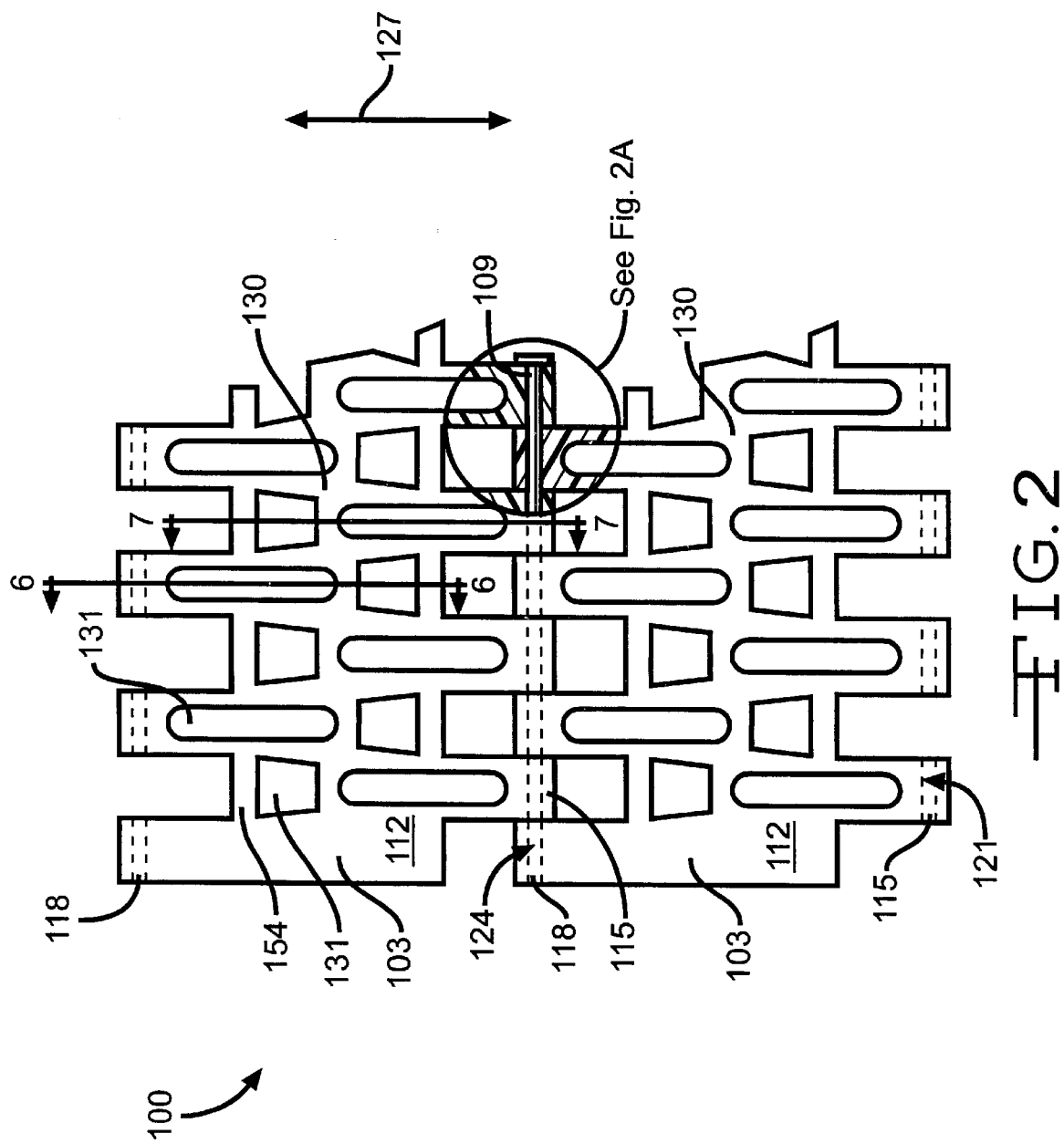
FIG. 2 is a top plan view of a portion of a belt formed by the modules of the present invention.
Figure 2A:
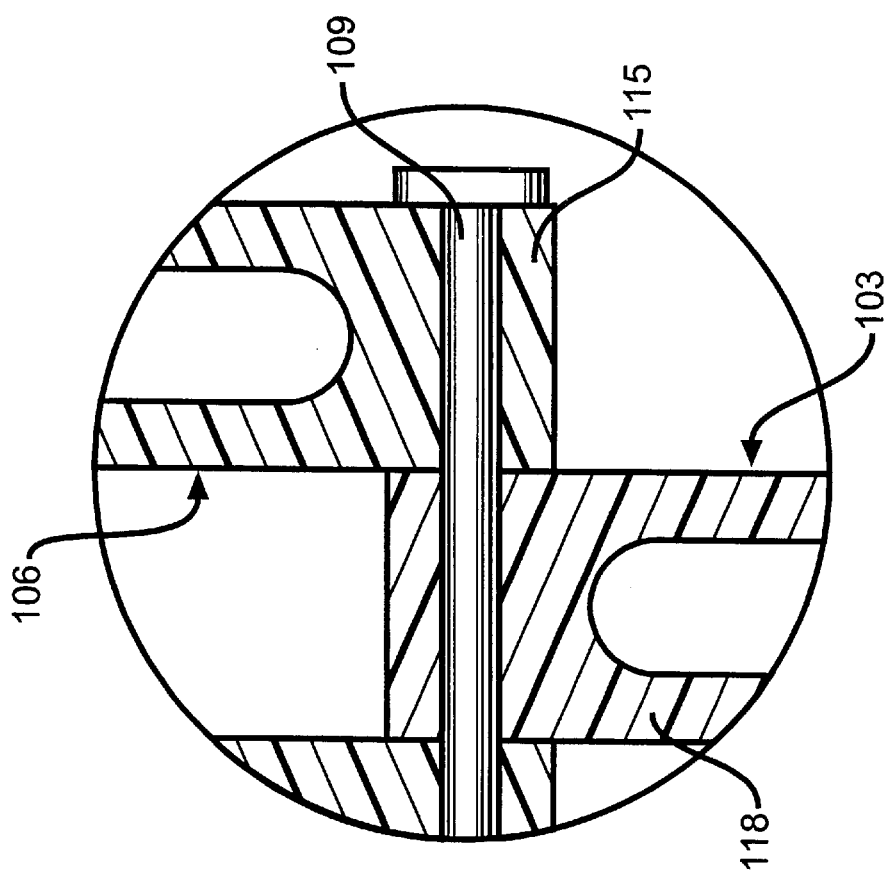
FIG. 2A is a detailed partial plan view of the belt shown in FIG. 2.

Referring generally to FIGS. 2–8, and initially to FIGS. 2 and 2A, a flush grid modular conveying belt 100 is shown with two interengaging belt modules 103 which are articulated on one another by a pivot rod 109. Each belt module 103 has a module body 112, a first and second series of link ends 115, 118 that project from two opposite sides of the module body 112. Each link end 115, 118 includes an opening 121, 124 that is disposed transverse to the direction of belt travel indicated by arrow 127. The belt 100 may be driven in either direction. A cross-rib 130 is also disposed transverse to the direction of belt travel.

The belt 100 is a flush grid type belt with vertical openings 131 disposed throughout. The openings 131 extend all the way through the modules 103. The openings 131 provide for cleaning of and reduce the weight of the modules 103.

Figure 3:
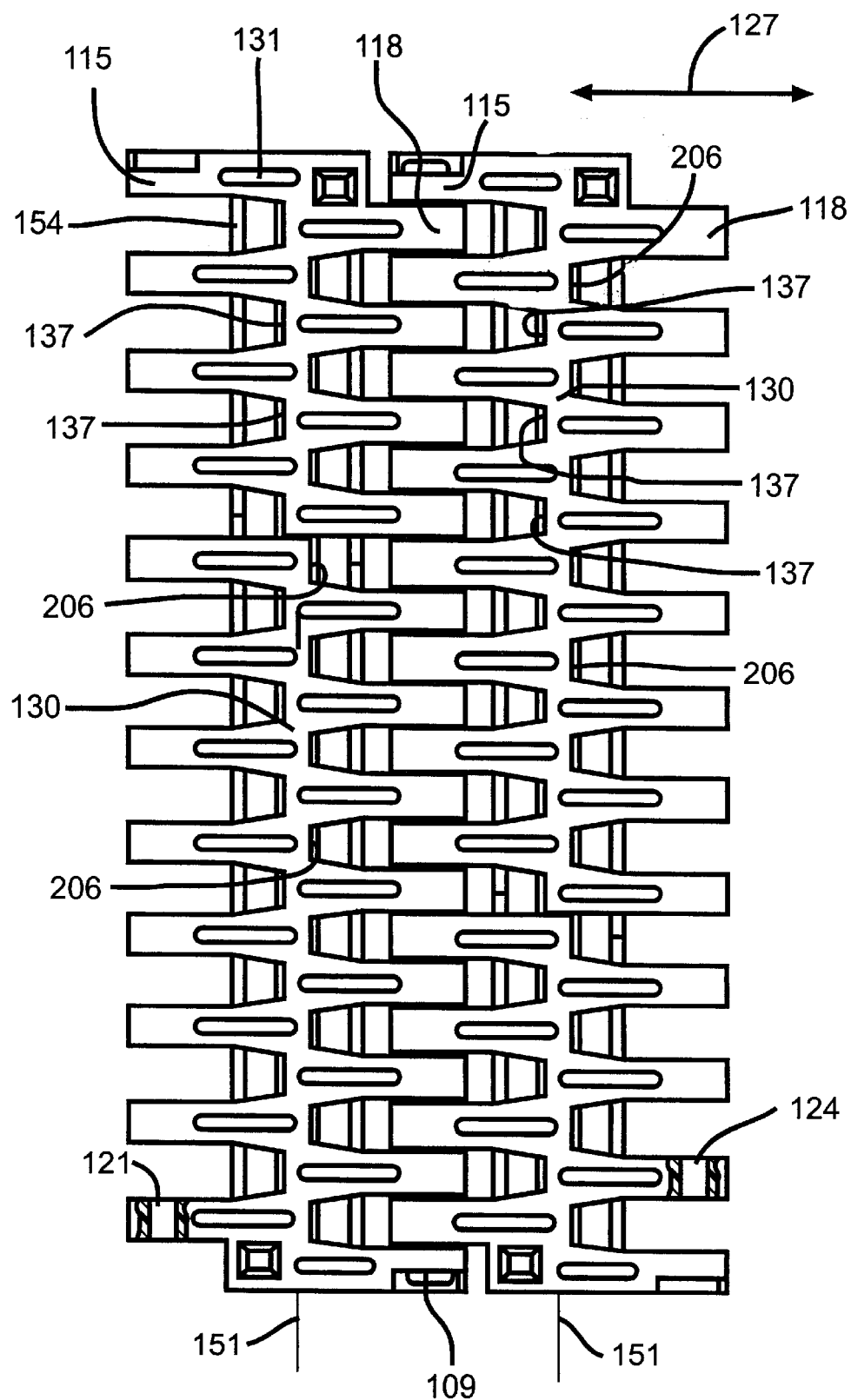
FIG. 3 is a bottom plan view of a belt of the present invention.

In FIG. 3, the cross-rib 130 is shown from the bottom of the belt 100. The cross-rib 130 is disposed such that a driving surface 137 is alternately offset from the centerline 151 of the module 103. The alternating sections of the cross-rib 130 form a serpentine shaped cross-rib 130 that in one section has the driving face 137 on the left with respect to the figure and in the adjacent section has the driving face 137 on the right. On the sides of the sections opposite from the driving faces 137, there is a vertical opening 131. The driving faces 137 are described in greater detail below in connection with FIGS. 6 and 7.

Figure 4:
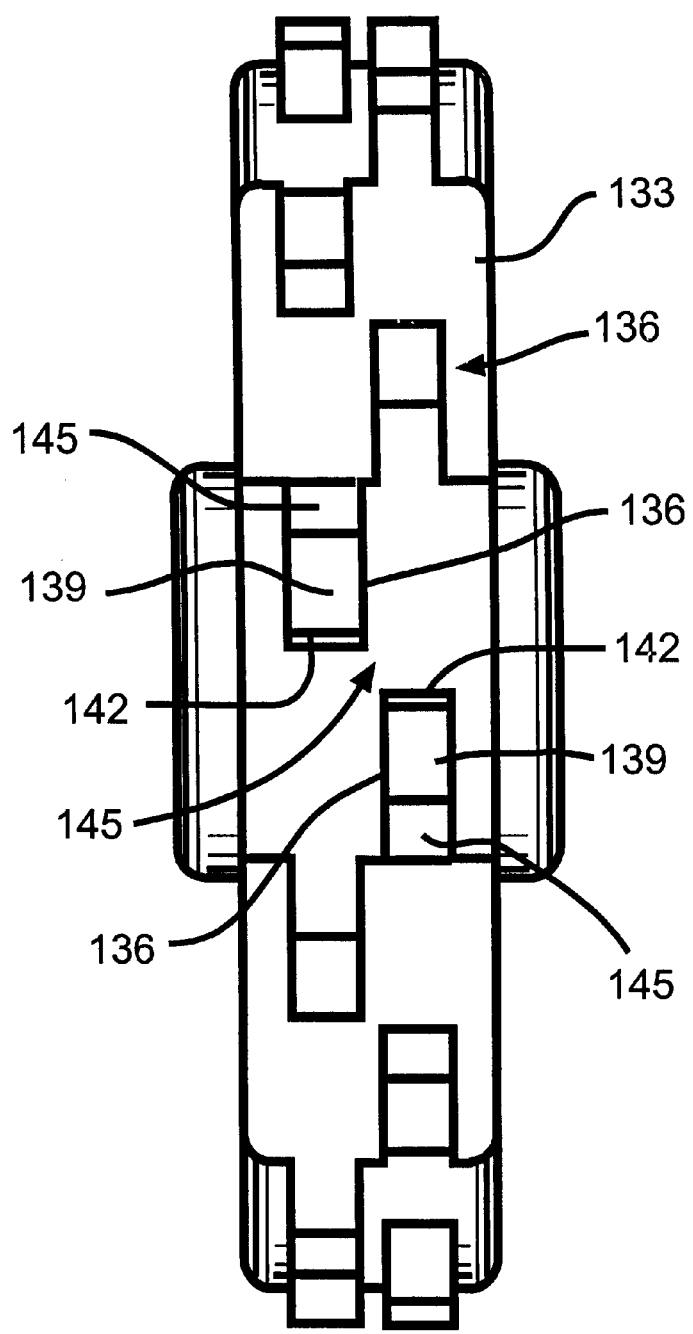
FIG. 4 is an end elevation view of the sprocket of the present invention.
Figure 5:
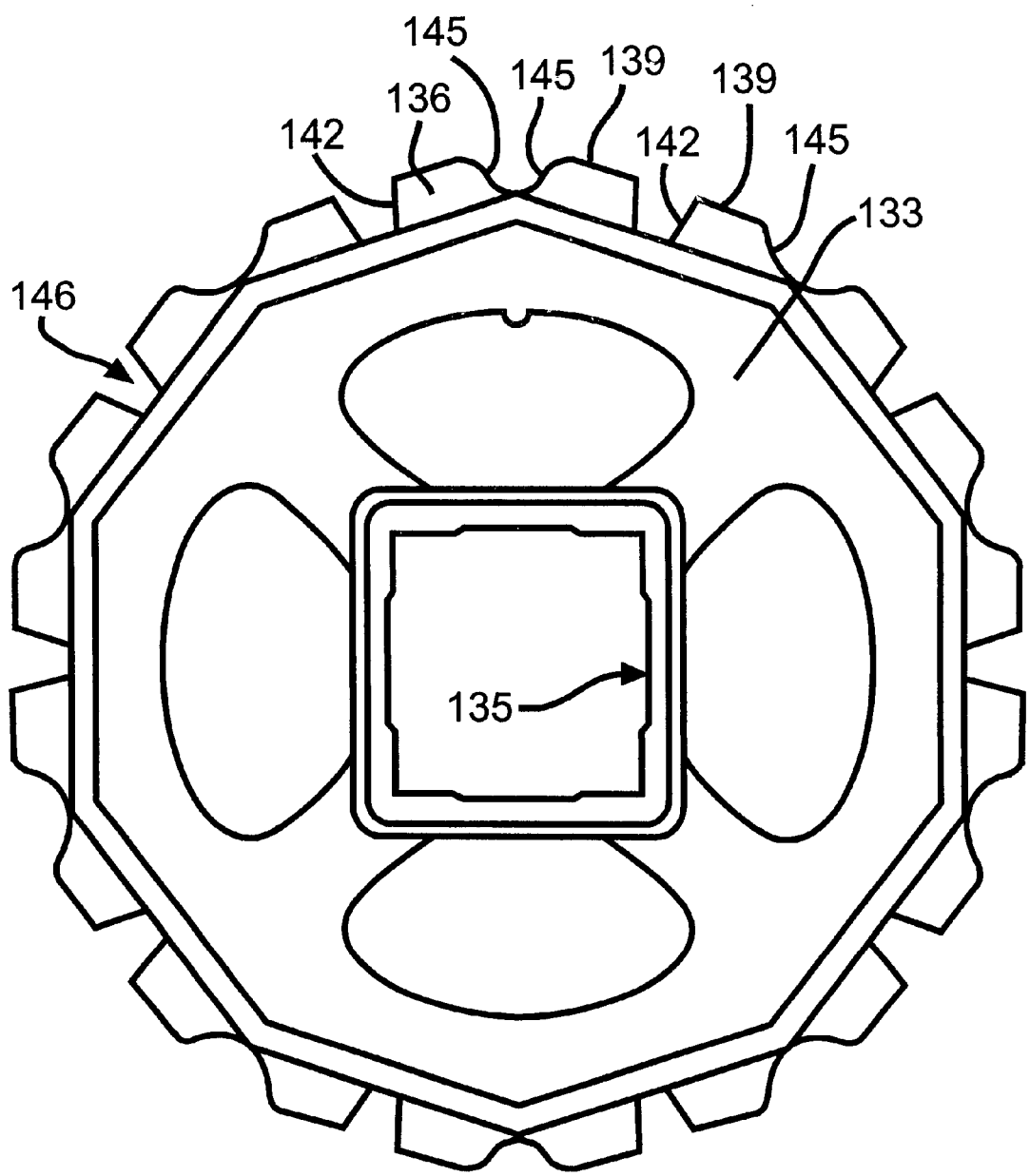
FIG. 5 is a side elevational view of the sprocket shown in FIG. 4.

Turning to FIGS. 4 and 5, a drive sprocket 133 has a set of teeth 136 disposed around its perimeter. The drive sprocket 133 is formed with eight sides, however, the sprocket 133 may be provided in different shapes and configurations including, but not limited to, similar arrangements with a different number of sides. The sprocket 133 has an opening 135 for receiving a drive shaft (not shown) as known to those of ordinary skill in the art. The teeth 136 are disposed such that the belt 100 may be driven in either direction. As shown, the teeth 136 include a top surface 139, an angled driving face 142, and an opposite face 145 for driving the curved link ends 115, 118. The driving faces 142 are oriented in both directions (facing right and left with respect to the orientation of FIG. 5) for driving the belt clockwise and counterclockwise with respect to the orientation of FIG. 5.

In FIG. 4, the orientation of the teeth 136 is shown. The teeth 136 are disposed in two rows with a pair of teeth 136 disposed on each side of the sprocket 133. The driving faces 142 may both face each other at equal and opposing angles as best shown in FIG. 5. When the sprocket 133 engages the belt 100, the cross-rib 130 fits in the space 146 between the two driving faces 142. Accordingly, the belt 100 may be driven in either direction by engagement of one of the respective driving faces 142 with the cross-rib 130 and engagement of the opposite face 145 with the link end 115, 118.

Figure 6:
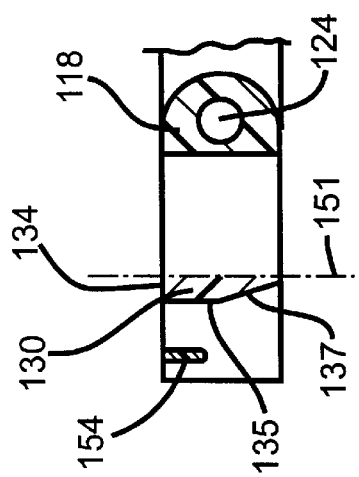
FIG. 6 is a cross-sectional view taken along lines 6—6 of FIG. 2.

In FIG. 6, the cross-rib 130 is shown at the point where it is offset to the left of the central axis 151 of the cross rib 130. The central axis 151 also corresponds to the center of the module 103. This portion of the cross-rib 130 engages with the clockwise driving face 142 on the sprocket 133. The top 134 of the cross-rib is coplanar with the top surface of the belt 100. On the left side of FIG. 6, the cross-rib 130 has a first portion 135 that may extend downward substantially perpendicular to the top surface 134. The driving surface 137 extends from the portion 135 to the bottom of the rib 130 at the angle discussed in detail below.

The link end 118 has an opening 124 for receiving the pivot rod 109 as described above. The modules 103 may also include stabilizing bars 154 disposed transverse to the direction of belt travel.

Figure 7:
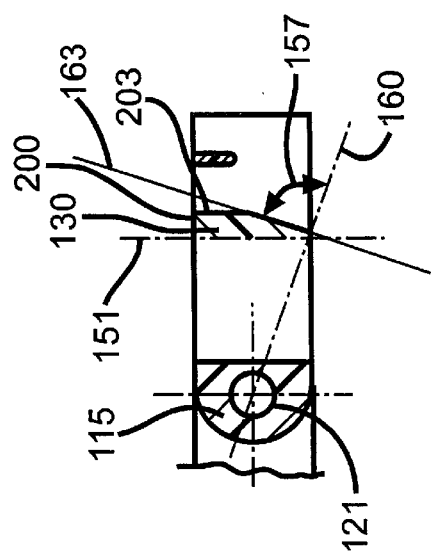
FIG. 7 is a cross-sectional view taken along lines 7—7 of FIG. 2.

In FIG. 7, the cross-rib 130 is shown at the point where it is offset to the right of the central axis 151 of the cross-rib 130. The central axis 151 also corresponds to the center of the module 103. This portion of the cross-rib 130 engages with the counterclockwise driving face 142 on the sprocket 133. The top 200 of the cross-rib is coplanar with the top surface of the belt 100. On the right side of FIG. 7, the cross-rib 130 has a first portion 203 that may extend downward substantially perpendicular to the top surface 200. The driving surface 206 extends from the portion 203 to the bottom of the rib 130 at the angle defined as follows. For optimal performance, the angle 157 between axes 160 and 163 is equal to or less than ninety degrees. This relationship also applies to the face 137 shown in FIG. 6.

The link end 115 also has an opening 121 for receiving the pivot rod 109.

Figure 8:
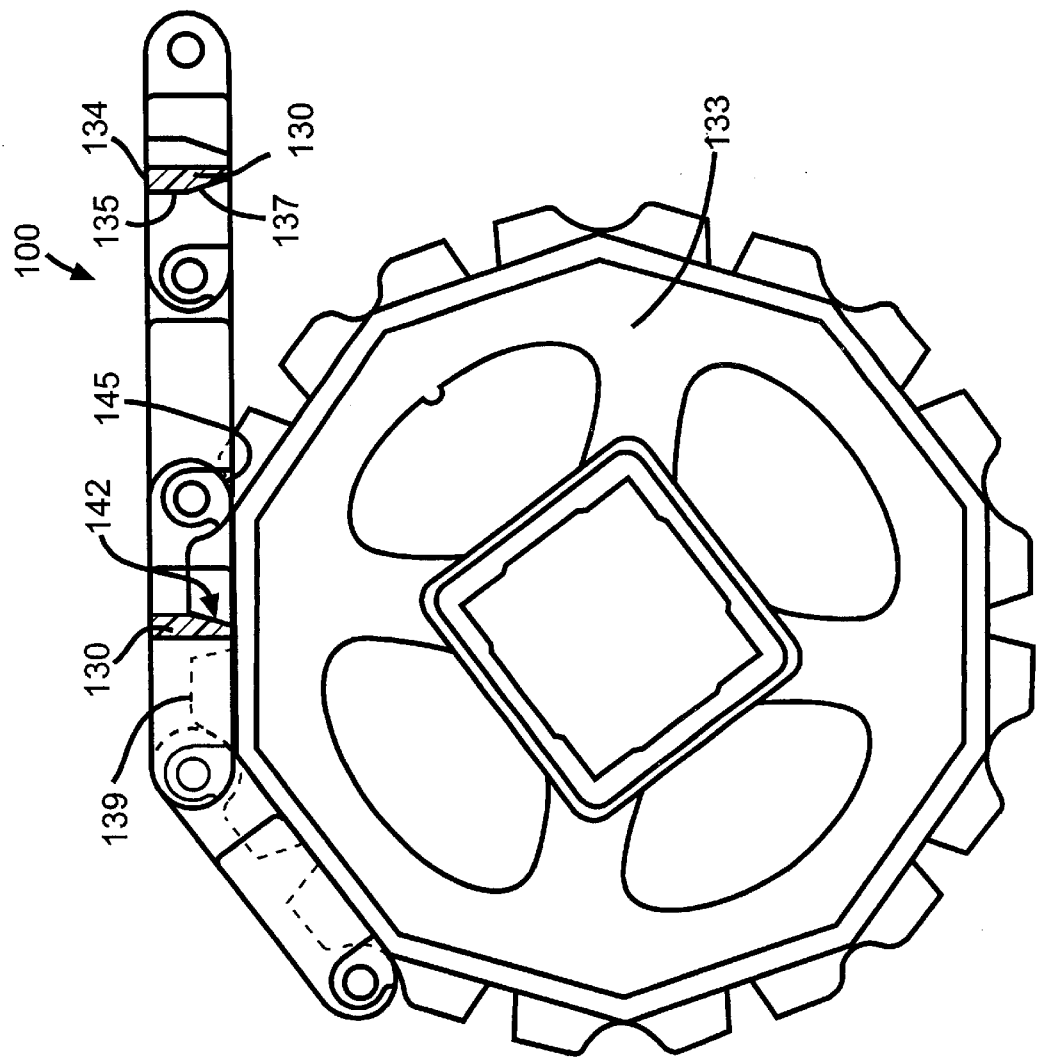
FIG. 8 is a side elevational view of the belt of the present invention engaging the sprocket and with a cross-sectional view of a pair of cross-ribs with one of the cross-ribs disposed for conveying in a first direction and the second cross-rib disposed for conveying in the opposite direction.

Turning to FIG. 8, the belt 100 is shown in engagement with the sprocket 133. The face 142 is engaged with one of the teeth 136 of the sprocket 133 and the belt 100 is being driven counterclockwise with respect to the orientation of FIG. 8. The link end 118 is also being driven by the face 145 of the sprocket tooth 136.

Accordingly, the present invention provides an optimized shape by alternating the offset of the cross-rib 130 from the centerline of the modules 103. As a result, the dimensioning of the cross-rib 130 for molding and module stiffness is optimized.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module, comprising:
   a first plurality of link ends disposed in a direction of belt travel;
   a second plurality of link ends extending in a direction opposite to the first plurality of link ends, the second link ends being offset from the first link ends such that adjacently positioned belt modules are capable of intercalating so that the first link ends of one belt module fit into spaces defined between the second plurality of link ends of an adjacent belt module;
   an intermediate section disposed along a centerline of the module and connecting the first plurality of link ends to the second plurality of link ends, the intermediate section having a first plurality of cross-rib sections facing in a first direction and having a second plurality of cross-rib sections facing in a second direction opposite the first direction, the cross-rib sections having an angled face that is capable of engaging with the teeth on a sprocket, the cross-rib sections disposed in alternating fashion on opposite sides of the centerline of the module.

2. The belt module of claim 1, wherein the angled face is planar.

3. The belt module of claim 1, wherein the face on the cross-rib section is angled with respect to an axis extending from the center of a pivot rod opening to the bottom of the cross-rib section, the angle of the face relative to the axis being less than or equal to ninety degrees.

4. The belt module of claim 1, further comprising a plurality of openings extending from a top surface to a bottom surface of the module.

5. The belt module of claim 1, wherein adjacent cross-rib sections have faces disposed at substantially equal and opposite angles.

6. The belt module of claim 1, further comprising stabilizing bars disposed transverse to the direction of belt travel.

7. A modular belt, comprising:
   a plurality of belt modules having a first plurality of link ends disposed in a direction of belt travel and having first pivot rod openings disposed transverse to the direction of belt travel; a second plurality of link ends extending in a direction opposite to the first plurality of link ends and having second pivot rod openings disposed transverse to the direction of belt travel, the second link ends being offset from the first link ends such that adjacently positioned belt modules are capable of intercalating so that the first link ends of one belt module fit into spaces defined between the second plurality of link ends of an adjacent belt module; and an intermediate section disposed along a centerline of the module and connecting the first plurality of link ends to the second plurality of link ends, the intermediate section having a first plurality of cross-rib sections facing in a first direction and having a second plurality of cross-rib sections facing in a second direction opposite the first direction, the cross-rib sections having an angled face that is capable of engaging with the teeth on a sprocket, the cross-rib sections disposed in alternating fashion on opposite sides of the centerline of the module;
   a plurality of pivot rods disposed through the first and second pivot rod openings such that the belt modules are intercalated and the adjacent belt modules are interlinked into adjacent hinged rows.

8. The modular belt of claim 7, wherein the angled face is planar.

9. The modular belt of claim 7, wherein the face on the cross-rib section is angled with respect to an axis extending from the center of a pivot rod opening to the bottom of the cross-rib section, the angle of the face relative to the axis being less than or equal to ninety degrees.

10. The modular belt of claim 7, further comprising a plurality of openings extending from a top surface to a bottom surface of the module.

11. The modular belt of claim 7, wherein adjacent cross-rib sections have faces disposed at substantially equal and opposite angles.

12. The modular belt of claim 7, further comprising stabilizing bars disposed transverse to the direction of belt travel.

13. A method of configuring a modular belt, comprising:

providing a plurality of belt modules having a first plurality of link ends disposed in a direction of belt travel and having first pivot rod openings disposed transverse to the direction of belt travel; a second plurality of link ends extending in a direction opposite to the first plurality of link ends and having second pivot rod openings disposed transverse to the direction of belt travel, the second link ends being offset from the first link ends such that adjacently positioned belt modules are capable of intercalating so that the first link ends of one belt module fit into spaces defined between the second plurality of link ends of an adjacent belt module; and an intermediate section disposed along a centerline of the module and connecting the first plurality of link ends to the second plurality of link ends, the intermediate section having a first plurality of cross-rib sections facing in a first direction and having a second plurality of cross-rib sections facing in a second direction opposite the first direction, the cross-rib sections having an angled face that is capable of engaging with the teeth on a sprocket, the cross-rib sections disposed in alternating fashion on opposite sides of the centerline of the module; and placing pivot rods through the first and second pivot rod openings in adjacent belt modules such that the first and second link ends of the adjacent belt modules are intercalated and the adjacent belt modules are interlinked into adjacent hinged rows to form an endless belt capable of articulating about a drive sprocket.

14. The method of claim 13, wherein the angled face is planar.

15. The method of claim 13, wherein the face on the cross-rib section is angled with respect to an axis extending from the center of a pivot rod opening to the bottom of the cross-rib section, the angle of the face relative to the axis being less than or equal to ninety degrees.

16. The method of claim 13, further comprising a plurality of openings extending from a top surface to a bottom surface of the module.

17. The method of claim 13, wherein adjacent cross-rib sections have faces disposed at substantially equal and opposite angles.

18. The method of claim 13, further comprising stabilizing bars disposed transverse to the direction of belt travel.

* * * * *